3,008,913
REACTION PRODUCT OF FIBROUS ALUMINA MONOHYDRATE, TETRAETHYL ORTHOSILICATE, AND DIPHENYLSILANEDIOL, PROCESS FOR MAKING, AND SOLVENT SOLUTION THEREOF
William James Pangonis, West Chester, Pa., assignor to E. I. du Pont de Nemours and Company, Wilmington, Del., a corporation of Delaware
No Drawing. Filed Oct. 29, 1958, Ser. No. 770,289
9 Claims. (Cl. 260—32.6)

This invention relates to polymeric materials, and more particularly to the production of novel film-forming organic-inorganic materials and the formation of shaped articles, e.g., film, therefrom.

An objective of this invention is to provide polymeric materials capable of being formed into shaped structures. Another object is to provide film-forming polymeric materials. Still another object is to provide orientable and oriented film structures of polymeric material. The foregoing and related objects will more clearly appear from the following description.

These objects are realized by the present invention which briefly stated, comprises forming a fibrous alumina monohydrate-tetraethyl orthosilicate - diphenylsilanediol polymer by heating in an organic solvent medium a reaction mixture consisting of from 10% to 90% by weight, based on the total weight of reactants, of fibrous alumina monohydrate substantially in the form of fibrils having at least one dimension in the colloidal range and having a boehmite crystal lattice, from 5% to 45% of tetraethyl orthosilicate, and from 5% to 45% of diphenylsilanediol as the sole reactants, for from about 20 minutes to about 40 minutes at temperatures within the range of from about 60° to about 80° C., forming the resulting solution of polymer into a shaped article, e.g., a film, and drying said article to remove solvent therefrom.

Fibrous alumina monohydrate useful for purposes of this invention is that described and claimed in U.S. Patent 2,975,475 (Bugosh). This material is characterized chiefly by its physical form which is one of sharply defined fibrils, each fibril being substantially uniform in diameter, the diameter being less than 150 millimicrons and preferably within the range of from about 2 to about 100 millimicrons. The fibrils have an average length of at least 350 millimicrons and an axial ratio (i.e., the ratio of the length of the fibril to its diameter) greater than 20:1. Fibrous alumina monohydrate in a sol is further characterized by having a boehmite crystal lattice, i.e., having the X-ray diffraction pattern of naturally occurring boehmite which is that shown in ASTM diffraction pattern card 2-0129.

Sols of fibrous alumina hydrate are further characterized by the specific surface area of the alumina monohydrate fibrils present in the dispersion, which is within the range of from 100 to 350 square meters per gram. The specific surface area of the fibrils is determined by drying the colloidal alumina monohydrate in such a way as to prevent aggregation, i.e., compacting of the fibrils, as described in the aforementioned patent, and thereafter measuring the specific surface area of the dried alumina monohydrate by the method of P. H. Emmett, "A New Method for Measuring the Surface Area of Finely Divided Materials and for Determining the Size of Particles," Symposium of New Methods for Particle Size Determination in the Sub-Sieve Range, p. 95, published by the American Society for Testing Materials, March 4, 1941.

A typical method for preparing fibrous alumina monohydrate suitable for purposes of this invention is as follows:

An alumina gel is precipitated by simultaneously metering an alum solution containing 1 part by weight of $Al_2(SO_4)_3 \cdot 18H_2O$ and 2 parts distilled water and a sodium carbonate solution containing 1 part $Na_2CO_3$ and 4 parts distilled water into the agitated reaction mass in an open tank. The reactant ratio, $CO_2/Al$, is maintained at $1.67 \pm 0.02$ (molar basis) at all times during the precipitation. After precipitation, the gel slurry is transferred to a filter nutsche and filtered using vacuum. The filter cake is washed on the nutsche using nine successive washes of distilled water at 70° C. Each wash volume is approximately equivalent to the volume of the filter cake. Thirty-eight parts of washed cake are transferred to a stirred kettle and mixed with 10.2 parts distilled water. This mixture is homogenized by pumping it through a centrifugal pump four times. This homogenized slurry analyzes as:

Percent $Al_2O_3$ _____ 7.94
Percent Na _____ 0.010
Percent $SO_4$ _____ 0.054
Na/Al _____ 0.0028
$SO_4$/Al _____ 0.0036

2,200 parts of this slurry are aged for 24 hours at 25° C. and are then mixed with 1218 parts of distilled water and 82.4 parts of glacial acetic acid. This mixture is placed in a flask equipped with a paddle agitator and heated to boiling (100° C.) and held at reflux for 5 minutes to drive off carbon dioxide. This reaction mix is then transferred to a stainless steel autoclave equipped with an agitator and heated to 160° C. in a period of 24 minutes. Temperature is maintained at 160° C. for one hour and then the charge is cooled to 70° C. for 10 minutes and discharged from the autoclave. This material, consisting of 3.5 kg. of product, is a translucent, fluid sol of the following analysis:

Percent $Al_2O_3$ _____ 4.96
Percent $CH_3COOH$ _____ 2.40
AN _____m.$^2$g__ 301
$L_f^1$ _____mu__ 279

[1] Average particle length as determined by streaming birefringence.

Preferably, tetraethyl orthosilicate and diphenylsilanediol, in essentially equal molar amounts, are dissolved in a suitable solvent, such as ethanol or dimethylformamide. This mixture is added slowly with slight agitation to a hydrosol of fibrous alumina monohydrate, prepared as described above, in which a minimum of acetic acid is absorbed on the colloidal particles. Continuing with slight agitation, the system is digested for approximately 20–40 minutes at about 60–80° C., and the resulting polymer then may be formed into shaped articles and allowed to dry (such as air dry, radiant heat or other suitable means). When the solvent system is cast onto plates and allowed to air dry, clear, tough, flexible, self-supporting polymeric films are obtained.

To produce a product capable of being converted into useful films and similar shaped structures, it is essential that heating of the reaction mixture within the specified temperature range be maintained for at least about 20 minutes, and for not longer than about 40 minutes. Heating for less than about 20 minutes results in a white powdery product, and if one attempts to form shaped articles therefrom, the articles are generally too brittle for use (e.g., a film could not be stripped from its casting surface). Similarly, if heating is continued much beyond 40 minutes, the system becomes thixotropic, and if heating is continued for an additional 10–20 minutes, the system will set to an irreversible gel which cannot be made into shaped objects. The system of reaction product and solvent should be shaped, e.g., cast into film, just before or at the point where the system becomes thixotropic.

Any organic solvent which is chemically inert under the conditions of the reaction and which may be removed in the final drying stage, may be employed in the process of this invention. For example, in addition to ethanol and dimethyl formamide previously mentioned, there may be employed solvents such as dimethylacetamide, dimethylsulfoxide, propyl alcohol, isopropyl alcohol, diethylene glycol, etc.

It is preferable to combine the reactants and solvents as stated in a precalculated manner so as to yield solution containing 0.5–40% by weight (more specifically 5–35%) polymer upon completion of the reaction, as such solutions containing polymers of sufficiently high molecular weight are viscous enough to be used directly for the preparation of said useful items, or can be diluted to the desired solution viscosity with additional solvent for such purposes.

Drying may be carried out by the application of heat by any means which will not destroy or that may accelerate degradation of the product, such as hot air, radiant heat, etc.

Film produced in accordance with the present invention may be oriented uniaxially or biaxially, by stretching and/or rolling the film in one direction (uniaxial) or in each of two mutually transverse directions (biaxial) to substantially increase the physical properties thereof such as tensile strength, tear strength and impact strength. The extent to which the film is stretched or rolled in one or both directions depends upon the physical properties required in the final film.

An oriented (i.e., stretched) film or like structure of this invention which has not been heat-set after stretching upon being subjected to elevated temperatures will, as is generally the case with oriented polymeric structures, tend to shrink to its original dimension. Hence, for the purpose of preparing shaped articles from the instant polymeric film, which articles will be form stable at elevated temperatures, the shaped article should be heat-set, i.e., the film should be subjected to a finite heat-setting step while the shaping pressure is being applied to form the shaped article. The heat-setting temperature is necessarily at least as high as the maximum temperature to which the shaped article will be exposed. It should be understood that the duration of heat-setting may be only a matter of a fraction of a second to as long as 20–30 minutes or longer; but in every instance, the temperature of the shaped article must be below the maximum heat setting temperature before the shaping pressure is released; or, in the cases where the duration of the heat-setting step is to be kept at a minimum, the shaping pressure is maintained until the temperature of the shaped object drops below the highest temperature at which the shaped article is to be used.

Although I do not wish to be bound by theory, it is essential to recognize that in the polymer of this invention the organic constituents of the reactants are in the side chains. As indicated in "Principles of High-Polymer Theory and Practice," by Schmidt and Mariles, McGraw-Hill (1948), p. 194: "The fundamental structural unit of the silicates is the orthosilicate ion, a regular tetrahedron with the smaller silicon atom symmetrically surrounded by four of the larger oxygen atoms. In high-polymer parlance, the orthosilicate tetrahedron is potentially polyfunctional, and hence, polymers of all types are possible. Indeed the bewildering number of silicates that have been identified is traceable in part to the fact two or more $(SiO_4)^{4-}$ tetrahedra may 'react' by sharing oxygen atoms with one another." Although the driving force leading to formation of —Si—O—Si— bonds is, of course, greater than that leading to the —Si—O—Al— bonds, it would appear that bonding occurs between the silica components and the alumina. X-ray data indicate that an interaction of the components occurs since the diagrams of the polymer of the present invention show lines not distinguishable in the diagrams of the original reactants. Upon further comparisons with the diagrams of the original reactants, bands have shifted position, disappeared, or increased in intensity in the polymeric system diagrams.

The following examples of several preferred embodiments will further serve to illustrate the principles and practices of the invention. In the examples, parts and percentages are by weight unless otherwise indicated.

*Example 1*

0.1 mole of tetraethyl orthosilicate (20.8 grams) and 0.1 mole of diphenylsilanediol (21.6 grams) are dissolved in 25 cc. of ethyl alcohol and warmed at 70–80° C. for 30 minutes. The total volume is 40 cc. Four cc. of this solution (containing 2.0 grams tetraethyl orthosilicate and 2.1 grams diphenylsilanediol) is added slowly (with slight agitation) to 100 grams of deionized fibrous alumina monohydrate hydrosol (containing 2.02 grams fibrous alumina monohydrate). This system, under slight agitation to insure homogeneity, is heated in a steam bath for 30 minutes at a temperature varying between 60° and 75° C. The system is poured onto a glass plate and allowed to dry for approximately 24 hours at room temperature. The resulting film is flexible, tough, clear and transparent, and can be rolled at room temperature to twice its original length which results in marked increases in toughness and tear strength.

*Example 2*

0.1 mole of tetraethyl orthosilicate (20.8 grams) and 0.1 mole of diphenylsilanediol (21.6 grams) are dissolved in 25 cc. of dimethylformamide and heated at 70°–80° C. for 30 minutes. The total volume is 45 cc. 4.5 cc. of the system (containing 2.0 grams of tetraethyl orthosilicate and 2.1 grams of diphenylsilanediol) is added to 100 grams of the fibrous alumina monohydrate hydrosol (containing 2.02 grams fibrous alumina monohydrate). This system, with slight agitation to insure homogeneity, is heated in a steam bath for 25 minutes at a temperature varying between 70° and 80° C. The system is poured onto a glass plate and allowed to dry for about 24 hours at room temperature. The film is then placed in an oven at 105° C. for approximately one hour to remove any excess solvent. The resulting film is flexible, tough, clear and transparent. As with the film in Example 1, the film can be rolled at room temperature to at least twice its initial length resulting in significant increases in toughness and tear strength. When placed between crossed Polaroid sheets, the film showed a high overall axial orientation. If the film is not heat-set, subjecting it to heating causes it to shrink to about 1½ times its original length; however, further heating at 120° C. for 16 hours or 160° C. for 2 hours had no apparent detrimental effects.

The polymer of this invention finds application in a wide variety of physical shapes and forms. Among the most significant of these forms are films and fibers. The useful combination of desirable physical and chemical characteristics of this polymer is unique. Films and fibers of this polymer not only possess excellent physical properties at room temperature, but retain their strength and excellent response to work loading at elevated temperatures for prolonged periods of time. Behavior of this type offers commercial utility in a wide range of end uses.

The polymer of this invention is characterized by its exceptionally high melting point. Generally, the polymer of this invention has a melting point in excess of 300° C., and in many instances, depending upon ratio of the starting reactants, above 350° C. The polymer of this invention is distinguished in having a combination of excellent resistance to corrosive atmospheres, and outstanding resistance to degradation by high-energy particle and gamma-ray radiation. This polymer resists melting upon exposure to 350° C. for extended periods while retaining a hitherto unrealized high proportion of room temperature physical properties. Because of its unusual and surprising solubility for such high melting polymer, this polymer may be processed into shaped structures such as films and fibers by conventional techniques. This polymer has high tenacity, good work recovery, high flex life at elevated temperatures. Additionally, the polymer in this invention has good thermal and hydrolytic stability.

Films formed from the polymer of this invention may be stretched or otherwise oriented according to conventional procedures. In the form of films, this polymer may be used wherever films have heretofore been used. They serve advantageously in an extensive variety of wrapping, packaging and bundling applications. Additionally, the polymer in film form may be used in automotive and aviation interior head lining materials, decorative trim, high temperature electrical insulation, such as for slot liners, use in dry transformers, capacitors, cable wrappings, etc., packaging of items to be exposed to high temperature or high energy radiation while within the package, corrosion resistant pipe, hot water pipe, duct work, containers and container linings, and laminating structures where the films are bonded to metal sheets or foils, and a variety of other similar and related uses. In fiber form, the polymer in the present invention offers possibilities for high temperature electrical insulation, protective clothing and curtains, filtration media, packing and gasketing materials, brake linings and clutch facings.

I claim:

1. A process for producing polymer which comprises heating in an organic solvent medium a reaction mixture consisting of from 10% to 90% by weight, based on the total weight of reactants, of fibrous alumina monohydrate substantially in the form of fibrils having a boehmite crystal lattice and each fibril having a diameter less than 150 millimicrons, from 5% to 45% of tetraethyl orthosilicate, and from 5% to 45% of diphenylsilanediol as the sole reactants, for from about 20 minutes to about 40 minutes at temperatures within the range of from about 60° to about 80° C. whereby to form a polymeric product.

2. A process for producing polymer which comprises heating in an organic solvent medium a reaction mixture consisting of from 10% to 90% by weight, based on the total weight of reactants, of fibrous alumina monohydrate substantially in the form of fibrils having a boehmite crystal lattice and each fibril having a diameter less than 150 millimicrons, from 5% to 45% of tetraethyl orthosilicate, and from 5% to 45% of diphenylsilanediol as the sole reactants, for from about 20 minutes to about 40 minutes at temperatures within the range of from about 60° to about 80° C., forming the resulting solution of reaction product into a shaped article, and heating said article to remove solvent therefrom.

3. The process according to claim 2 wherein the solvent medium is ethanol.

4. The process according to claim 2 wherein the solvent medium is dimethylformamide.

5. The process according to claim 2 wherein the solution of reaction product is formed into a film.

6. The polymeric product resulting from the reaction between from 10% to 90% by weight, based on the total weight of reactants, of fibrous alumina monohydrate substantially in the form of fibrils having a boehmite crystal lattice and each fibril having a diameter less than 150 millimicrons, from 5% to 45% of tetraethyl orthosilicate, and from 5% to 45% of diphenylsilanediol, said product having a melting point above 300° C. and being capable of being formed into transparent, orientable self-supporting film.

7. The polymeric product of claim 6 in the form of a film.

8. A composition of matter comprising essentially an organic solvent solution of the polymeric product resulting from the reaction between from 10% to 90% by weight, based on the total weight of reactants, of fibrous alumina monohydrate substantially in the form of fibrils having a boehmite crystal lactice and each fibril having a diameter less than 150 millimicrons, from 5% to 45% of tetraethyl orthosilicate, and from 5% to 45% of diphenylsilanediol, said product having a melting point above 300° C., the concentration of said product in solution being within the range of 0.5% to 40% by weight.

9. The composition of claim 8 wherein the concentration of said polymeric product in solution is within the range of from 5% to 35% by weight.

No references cited.

UNITED STATES PATENT OFFICE
CERTIFICATE OF CORRECTION

Patent No. 3,008,913            November 14, 1961

William James Pangonis

It is hereby certified that error appears in the above numbered patent requiring correction and that the said Letters Patent should read as corrected below.

Column 2, line 32, for "for" read -- in --; column 6, line 33, for "lactice" read -- lattice --.

Signed and sealed this 17th day of April 1962.

(SEAL)
Attest:

ESTON G. JOHNSON            DAVID L. LADD

Attesting Officer            Commissioner of Patents